(12) United States Patent
Kawai et al.

(10) Patent No.: US 11,934,075 B2
(45) Date of Patent: Mar. 19, 2024

(54) DISPLAY DEVICE

(71) Applicant: Japan Display Inc., Tokyo (JP)

(72) Inventors: Kentaro Kawai, Tokyo (JP); Keita Sasanuma, Tokyo (JP); Takayuki Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 90 days.

(21) Appl. No.: 17/305,467

(22) Filed: Jul. 8, 2021

(65) Prior Publication Data

US 2022/0019113 A1  Jan. 20, 2022

(30) Foreign Application Priority Data

Jul. 15, 2020 (JP) ................. 2020-121526

(51) Int. Cl.
*G02F 1/1362* (2006.01)
*G02F 1/1345* (2006.01)

(52) U.S. Cl.
CPC ...... *G02F 1/136295* (2021.01); *G02F 1/1345* (2013.01); *G02F 1/13458* (2013.01)

(58) Field of Classification Search
CPC .............. G02F 1/1345; G02F 1/13452; G02F 1/13454; G02F 1/13456; G02F 1/13458; G02F 1/13338; G06F 3/0412
See application file for complete search history.

(56) References Cited

U.S. PATENT DOCUMENTS

| | | | |
|---|---|---|---|
| 2005/0029514 A1* | 2/2005 | Moriya | H01L 51/0545 257/40 |
| 2015/0301389 A1* | 10/2015 | Yoshida | G02F 1/136209 257/43 |
| 2018/0046012 A1* | 2/2018 | Miyamoto | G02F 1/13439 |
| 2018/0341143 A1 | 11/2018 | Hyodo et al. | |
| 2020/0278587 A1* | 9/2020 | Fukami | H01L 27/124 |
| 2021/0033902 A1 | 2/2021 | Shiina | |
| 2021/0349340 A1* | 11/2021 | Hara | G02F 1/136227 |

FOREIGN PATENT DOCUMENTS

| | | |
|---|---|---|
| JP | 2018-200377 A | 12/2018 |
| JP | 2019-191460 A | 10/2019 |

* cited by examiner

*Primary Examiner* — Alexander P Gross
(74) *Attorney, Agent, or Firm* — Maier & Maier, PLLC (57) ABSTRACT

According to one embodiment, a display device includes a display portion, a first terminal, a second terminal located between the display portion and the first terminal, and an insulating film, in which each of the first terminal and the second terminal is a stacked layer body of a metal electrode and a first transparent electrode, in the first terminal, the first transparent electrode is in contact with an upper surface and a side surface of the metal electrode, in the second terminal, the insulating film is in contact with a side surface of the metal electrode, and the first transparent electrode is in contact with the upper surface of the metal electrode in an inside surrounded by the insulating film.

10 Claims, 11 Drawing Sheets

DISPLAY DEVICE

CROSS-REFERENCE TO RELATED APPLICATION

This application is based upon and claims the benefit of priority from Japanese Patent Application No. 2020-121526, filed Jul. 15, 2020, the entire contents of which are incorporated herein by reference.

FIELD

Embodiments described herein relate generally to a display device.

BACKGROUND

Various display devices such as a liquid crystal display device and an organic electroluminescent display device include a terminal portion at one end on a substrate. The terminal portion contains a terminal for supplying a signal necessary for driving pixels. In recent years, in various display devices with a touch detection function that have been proposed, the terminal portion includes a terminal for transmitting and receiving a signal necessary for touch detection.

For example, a display device including a terminal electrode formed of the same material as a source electrode and the like and electrically connecting a bump of an IC and the terminal electrode is disclosed. In another example, a display device including a terminal portion configured by laminating a plurality of conductive layers and electrically connecting a terminal of a flexible printed circuit board and the terminal portion is disclosed.

DETAILED DESCRIPTION

In general, according to one embodiment, a display device includes:

a display portion; a first terminal; a second terminal located between the display portion and the first terminal; and an insulating film, in which each of the first terminal and the second terminal is a stacked layer body of a metal electrode and a first transparent electrode, in the first terminal, the first transparent electrode is in contact with an upper surface and a side surface of the metal electrode, in the second terminal, the insulating film is in contact with a side surface of the metal electrode, and the first transparent electrode is in contact with the upper surface of the metal electrode in an inside surrounded by the insulating film.

In addition, the display device according to the present embodiment includes:

a display portion; a first terminal; a second terminal located between the display portion and the first terminal; and a relay portion located between the display portion and the second terminal, in which the display portion includes a scanning line; a signal line; a metal line located directly above the signal line; a common electrode electrically connected to the metal line; and a pixel electrode located directly above the common electrode, and the relay portion includes a first relay electrode formed of the same material as the signal line; a second relay electrode electrically connected to the second terminal, formed of the same material as the metal line, spaced apart from the metal line, and in contact with the first relay electrode; a third relay electrode formed of the same material as the common electrode and in contact with the metal line; and a fourth relay electrode formed of the same material as the pixel electrode and in contact with the first relay electrode and the third relay electrode.

In addition, the display device according to the present embodiment includes:

a display portion including a scanning line, a signal line extending in a direction intersecting the scanning line, a metal line located directly above the signal line, a common electrode electrically connected to the metal line, and a pixel electrode overlapping the common electrode; and a mounting portion including a first terminal and a second terminal connected to an external circuit, in which each of the first terminal and the second terminal is a stacked layer body of a first metal electrode, a second metal electrode covering the first metal electrode, and a third metal electrode covering the second metal electrode, the first metal electrode is formed of the same material as the scanning line, the second metal electrode is formed of the same material as the signal line, the third metal electrode is formed of the same material as the metal line, and in any of the first terminal and the second terminal, an edge portion of the third metal electrode is covered with an insulating film formed between the signal line and the common electrode.

Hereinafter, the present embodiment will be described with reference to the drawings. The disclosure is merely an example, and appropriate modifications that can be easily conceived by those skilled in the art while maintaining the gist of the invention are naturally included in the scope of the present invention. In addition, in order to make the description clearer, the drawings may schematically illustrate widths, thicknesses, shapes, and the like of the respective parts as compared with the actual aspects, but those illustrations are merely examples and do not limit the interpretation of the present invention. In addition, in the present specification and the respective drawings, elements that exert the same or similar functions as those described above with respect to the previously described drawings are denoted by the same reference numerals, and a redundant detailed description will be appropriately omitted.

In the present embodiment, a liquid crystal display device will be described as an example of a display device DSP. The main configuration disclosed in the present embodiment is also applicable to a self-luminous display device having an organic electroluminescence display element, a pLED, or the like, a display device having an electrophoretic element or the like, a display device utilizing micro-electromechanical systems (MEMS), a display device utilizing electrochromism, or the like. In addition, the main configuration disclosed in the present embodiment is also applicable not only to the display devices but also to an electronic device such as a sensor device.

Figure 1:
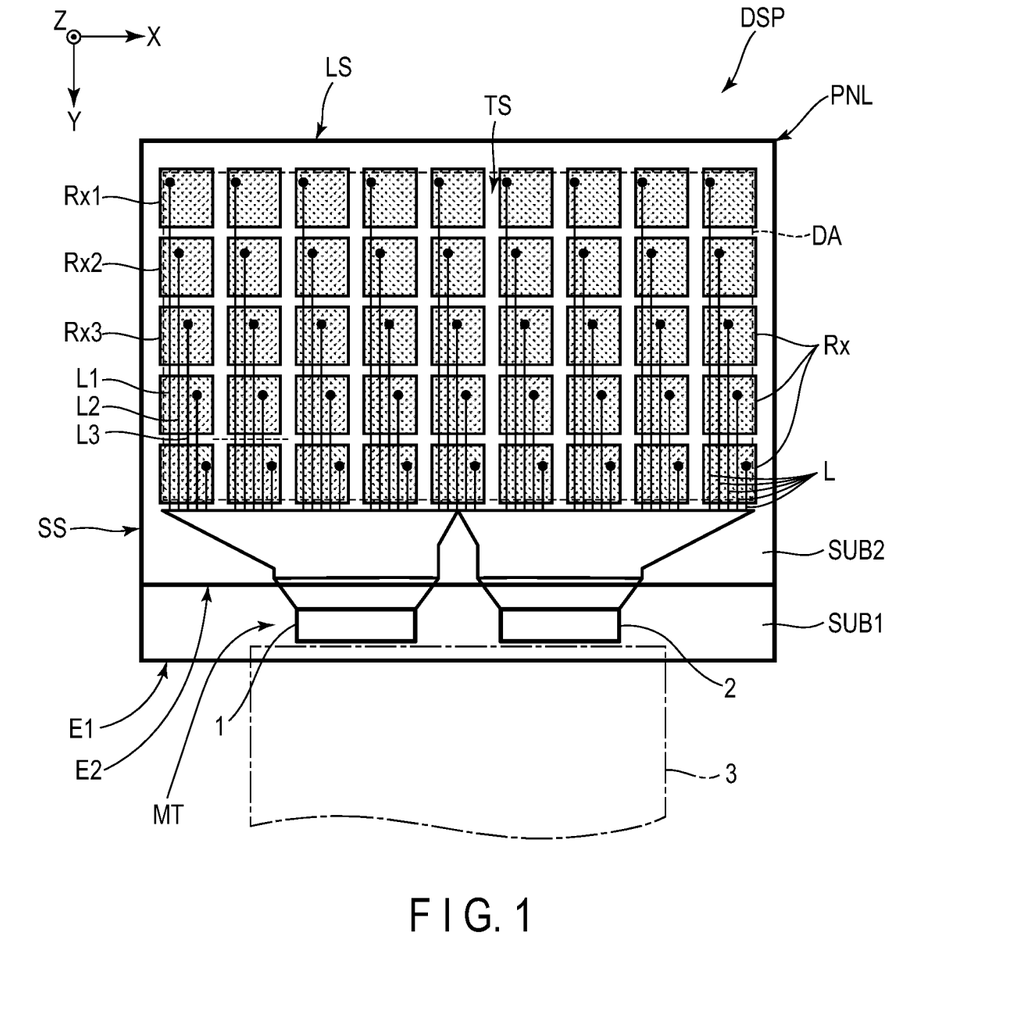
FIG. 1 is a plane view showing a configuration example of a display device DSP of the present embodiment.

FIG. 1 is a plane view showing a configuration example of a display device DSP of the present embodiment. For example, a first direction X, a second direction Y, and a third direction Z are orthogonal to each other, but may intersect at an angle other than 90 degrees. The first direction X and the second direction Y correspond to the directions parallel to the main surface of a substrate constituting the display device DSP, and the third direction Z corresponds to the thickness direction of the display device DSP.

The display device DSP includes a display panel PNL, IC chips 1 and 2, a flexible printed circuit board 3 indicated by dash-dotted lines, and a touch sensor TS. Here, for convenience, a direction in which the long side LS of the display panel PNL extends is referred to as the first direction X, and a direction in which the short side SS of the display panel PNL extends is referred to as the second direction Y. The direction in which the long side LS extends may be the second direction Y, and the direction in which the short side SS extends may be the first direction X.

The display panel PNL is a liquid crystal panel, and includes a first substrate SUB1, a second substrate SUB2, and a liquid crystal layer LC to be described later. The display panel PNL includes a display portion DA that displays an image as indicated by dotted lines. Details of the display portion DA will be described later. The first substrate SUB1 has a substrate edge portion E1 extending in the first direction X. The second substrate SUB2 has a substrate edge portion E2 located between the display portion DA and the substrate edge portion E1. The first substrate SUB1 has a mounting portion MT between the substrate edge portion E1 and the substrate edge portion E2 in planar view.

The IC chips 1 and 2 and the flexible printed circuit board 3 are mounted on the mounting portion MT.

The touch sensor TS is, for example, a self-capacitive sensor, but may be a mutual-capacitive sensor. The touch sensor TS includes a plurality of sensor electrodes Rx (Rx1, Rx2, Rx3 . . . ) and a plurality of sensor lines L (L1, L2, L3 . . . ). The sensor electrodes Rx are located on the display portion DA and are arrayed in a matrix in the first direction X and the second direction Y. In the display portion DA, the sensor lines L extend in the second direction Y and are arranged in the first direction X. Each of the sensor lines L is disposed, for example, at a position overlapping a signal line S to be described later. In addition, each of the sensor lines L is electrically connected to any of the IC chips 1 and 2.

Figure 2:
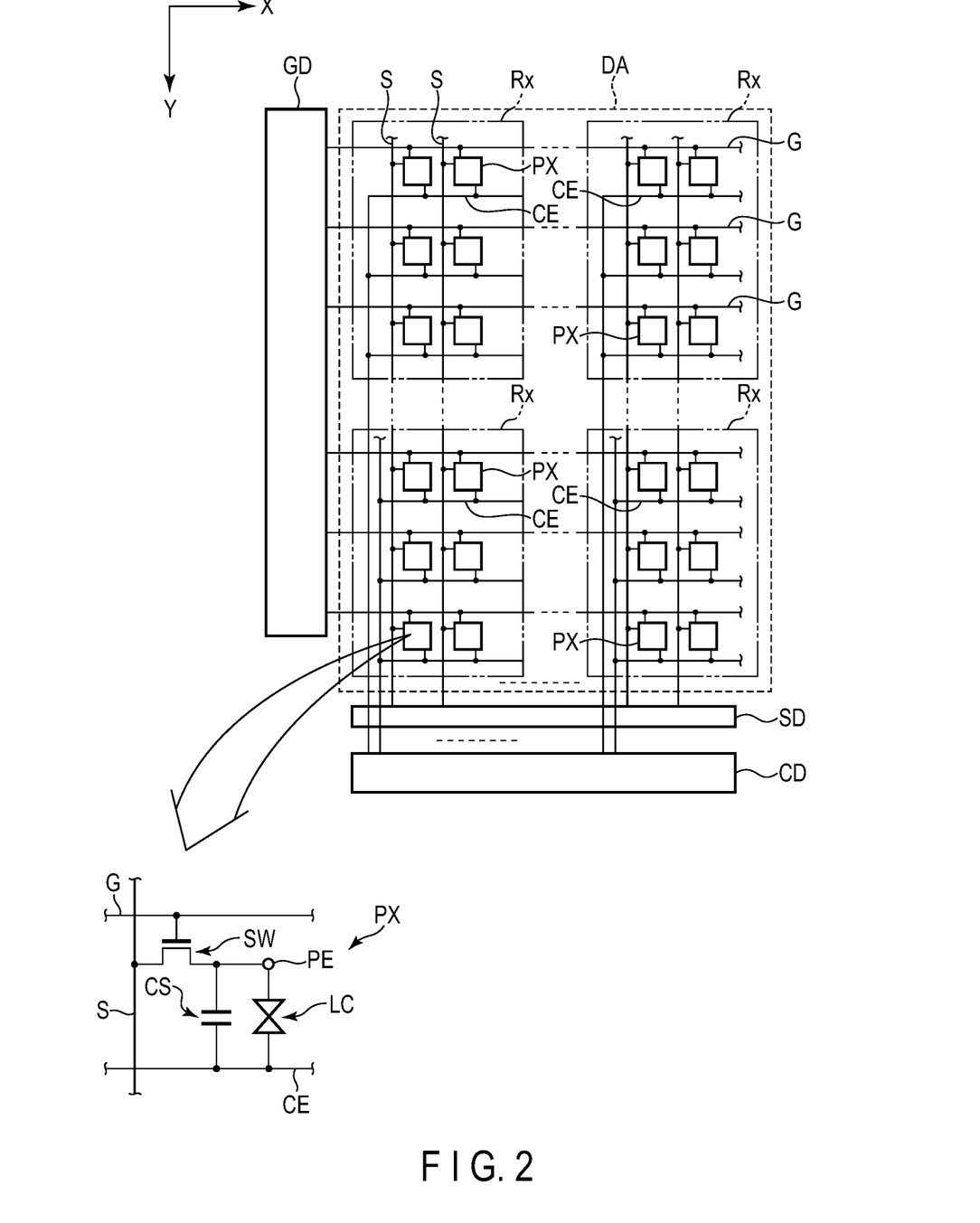
FIG. 2 is a view showing a basic configuration and an equivalent circuit of a display portion DA illustrated in FIG. 1.

FIG. 2 is a view showing a basic configuration and an equivalent circuit of the display portion DA illustrated in FIG. 1. The display portion DA includes a plurality of pixels PX arrayed in a matrix in the first direction X and the second direction Y. A plurality of scanning lines G are connected to a scanning line driver GD. A plurality of signal lines S are connected to a signal line driver SD. A common electrode CE constitutes the sensor electrode Rx illustrated in FIG. 1. One common electrode CE or one sensor electrode Rx is disposed over the pixels PX. The common electrode CE is connected to a voltage supply unit CD.

In an image display mode for displaying an image, the voltage supply unit CD supplies a common voltage (Vcom) to the common electrode CE. In a touch sensing mode for detecting approach or contact of an object to the display portion DA, the voltage supply unit CD supplies a touch drive voltage different from the common voltage to the common electrode CE.

Each pixel PX includes a switching element SW, a pixel electrode PE, a common electrode CE, a liquid crystal layer LC, and the like. The switching element SW is constructed from, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y.

The pixel electrode PE is electrically connected to the switching element SW. Each of the pixel electrodes PEs is opposed to the common electrode CE, and the liquid crystal layer LC is driven by an electric field generated between the pixel electrode PE and the common electrode CE. A capacitance CS is formed, for example, between an electrode having the same electric potential as the common electrode CE and an electrode having the same electric potential as the pixel electrode PE.

Figure 3:
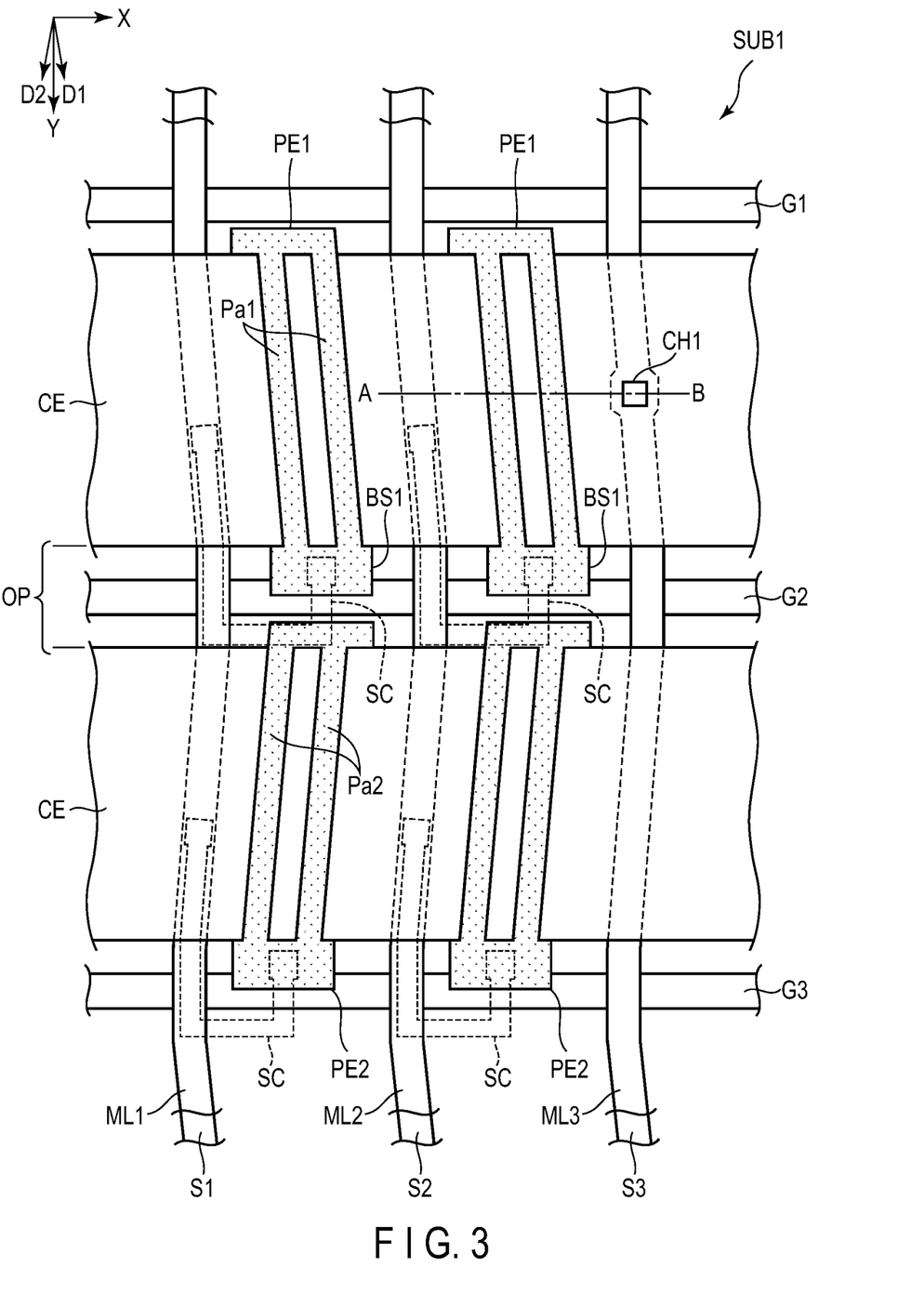
FIG. 3 is a plane view showing a configuration example of a pixel layout in a first substrate SUB1.

FIG. 3 is a plane view showing a configuration example of a pixel layout in the first substrate SUB1. Here, only configurations necessary for description are illustrated. The scanning lines G1 to G3 linearly extend along the first direction X and are arranged spaced apart in the second direction Y. The signal lines S1 to S3 extend substantially along the second direction Y and are arranged spaced apart in the first direction X. Metal lines ML1 to ML3 overlap the signal lines S1 to S3, respectively, in planar view. The extending direction of the metal lines ML1 to ML3 is substantially parallel to the extending direction of the signal lines S1 to S3. A semiconductor layer SC of the switching element illustrated in FIG. 2 is indicated by dotted lines. The semiconductor layer SC is formed of, for example, polycrystalline silicon, but may be formed of amorphous silicon or an oxide semiconductor. The common electrode CE is electrically connected to the metal line ML3 in a contact hole CH1, for example.

The pixel electrodes PE1 are located between the scanning lines G1 and G2, and are arranged in the first direction X. The pixel electrode PE1 has a base BS1 and a strip electrode Pa1. The base BS1 is located in an opening OP of the common electrode CE. The strip electrode Pa1 overlaps the common electrode CE. The strip electrode Pa1 extends in a direction D1 different from the first direction X and the second direction Y. Such pixel electrode PE1 is electrically connected to the semiconductor layer SC at the base BS1.

The pixel electrode PE2 is located between the scanning lines G2 and G3, though not described in detail. The pixel electrode PE2 has a strip electrode Pa2 overlapped on the common electrode CE. The strip electrode Pa2 extends in a direction D2 different from the direction D1. In the example illustrated in FIG. 3, the number of strip electrodes Pa1 and Pa2 is two, but may be one or three or more.

Figure 4:
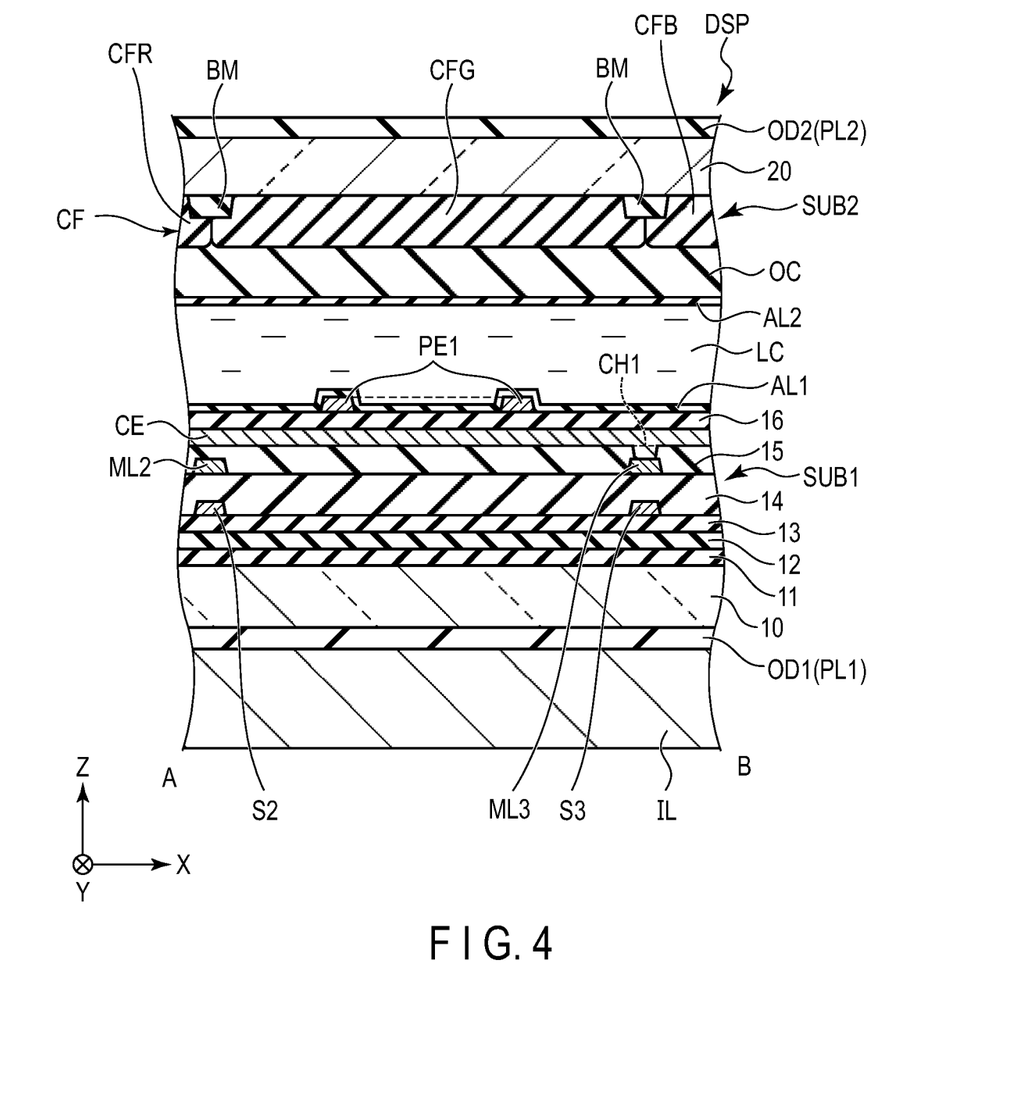
FIG. 4 is a cross-sectional view showing a configuration example of the display device DSP taken along line A-B illustrated in FIG. 3.

FIG. 4 is a cross-sectional view showing a configuration example of the display device DSP taken along line A-B illustrated in FIG. 3. The display device DSP illustrated in FIG. 4 corresponds to an example in which a display mode using an electric field along an X-Y plane defined by the first direction X and the second direction Y is applied.

The first substrate SUB1 includes an insulating substrate 10, insulating films 11 to 16, the signal lines S2 and S3, the metal lines ML2 and ML3, the common electrode CE, the pixel electrode PE1, an alignment film AL1, and the like. The semiconductor layer SC illustrated in FIG. 3 is interposed between the insulating film 11 and the insulating film 12. The scanning lines G illustrated in FIG. 2 and the like are interposed between the insulating films 12 and 13.

The signal lines S2 and S3 are disposed on the insulating film 13 and covered with the insulating film 14. The signal lines S2 and S3 are configured as, for example, a stacked layer body in which a plurality of metal layers are stacked.

The metal lines ML2 and ML3 are disposed on the insulating film 14 and covered with the insulating film 15. The metal line ML2 is located directly above the signal line S2, and the metal line ML3 is located directly above the signal line S3. The metal lines ML2 and ML3 are configured as, for example, a stacked layer body in which a plurality of metal layers are stacked. These metal lines ML2 and ML3 can form the sensor lines L of the touch sensor TS described with reference to FIG. 1.

The common electrode CE is disposed on the insulating film 15 and is covered with the insulating film 16. In addition, the common electrode CE is in contact with the metal line ML3 in the contact hole CH1 penetrating the insulating film 15. The pixel electrode PE1 is located directly above the common electrode CE, is disposed on the insulating film 16, and is covered with the alignment film AL1. The common electrode CE and the pixel electrode PE1 are formed of, for example, a transparent conductive material such as indium tin oxide (ITO) or indium zinc oxide (IZO).

The insulating films 11 to 13 and the insulating film 16 are transparent inorganic insulating films such as silicon oxide, silicon nitride, and silicon oxynitride, and may have a single-layer structure or a multi-layer structure. The insulating film 14 is, for example, a transparent organic insulating film (first organic insulating film) such as an acrylic resin. The insulating film 15 is, for example, a transparent organic insulating film (second organic insulating film) such as an acrylic resin, but may be a transparent inorganic insulating film.

The second substrate SUB2 includes an insulating substrate 20, a light-shielding layer BM, a color filter layer CF, an overcoat layer OC, an alignment film AL2, and the like. Similar to the insulating substrate 10, the insulating substrate 20 is a transparent substrate such as a glass substrate or a flexible resin substrate. The color filter layer CF includes a red color filter CFR, a green color filter CFG, and a blue color filter CFB. The overcoat layer OC covers the color filter layer CF. The alignment film AL2 covers the overcoat layer OC. The alignment films AL1 and AL2 are formed of, for example, a material exhibiting a horizontal alignment property.

The liquid crystal layer LC is located between the first substrate SUB1 and the second substrate SUB2, and is held between the alignment film AL1 and the alignment film AL2.

An optical element OD1 including a polarizer PL1 is adhered to the insulating substrate 10. An optical element OD2 including a polarizer PL2 is adhered to the insulating substrate 20. The optical elements OD1 and OD2 may include a retardation film, a scattering layer, an antireflective layer, and the like, as needed. An illumination device IL is opposed to the first substrate SUB1 via the optical element OD1 in the third direction Z.

Figure 5:
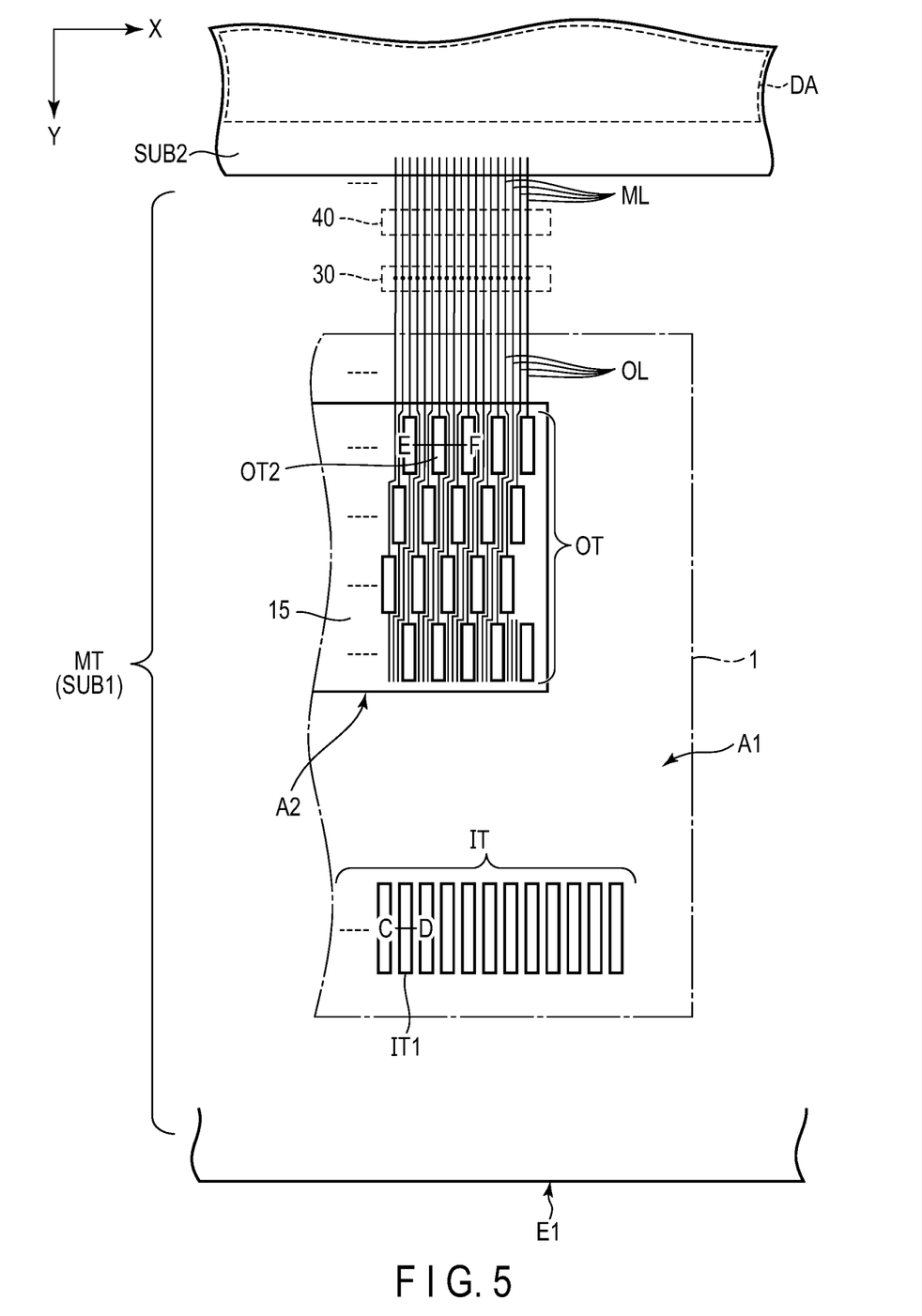
FIG. 5 is an enlarged plane view showing a configuration example of a mounting portion MT of the first substrate SUB1 illustrated in FIG. 1.

FIG. 5 is an enlarged plane view showing a configuration example of the mounting portion MT of the first substrate SUB1 illustrated in FIG. 1. The IC chip 1 as an external circuit is indicated by dash-dotted lines. In an overlapping area A1 where the IC chip 1 overlaps, the first substrate SUB1 includes an input terminal IT and an output terminal OT. The input terminal IT is located between the output terminal OT and the substrate edge portion E1 in the second direction Y. The output terminal OT is located between the display portion DA (or the second substrate SUB2) and the input terminal IT in the second direction Y. The input terminal IT and the output terminal OT are formed in, for example, a rectangular shape extending in the second direction Y. The input terminal IT is connected to an input-side terminal of the IC chip 1. The output terminal OT is connected to an output-side terminal of the IC chip 1.

In addition, the first substrate SUB1 includes a layer conversion portion 30 and a relay portion 40. The layer conversion portion 30 and the relay portion 40 are located between the display portion DA (or the second substrate SUB2) and the output terminal OT in the second direction Y. In addition, the relay portion 40 is located between the display portion DA (or the second substrate SUB2) and the layer conversion portion 30 in the second direction Y. Details of the layer conversion portion 30 and the relay portion 40 will be described later. It should be noted that the relay portion 40 may be omitted.

An output line OL electrically connected to each of the output terminals OT is, for example, a line on the same layer as the scanning line G1 and the like illustrated in FIG. 3. Each of the output lines OL extends toward the display portion DA and is electrically connected to the metal line ML at the relay portion 40. A line extending from each of the output terminals OT toward the input terminal IT is connected to a circuit (not shown), other line, or the like. Each of the input terminals IT is not electrically connected to the metal line ML.

In such mounting portion MT, in an area A2 including the output terminals OT, the insulating film 14 illustrated in FIG. 4 is not disposed, and the insulating film 15 is disposed except the central portion of each output terminal OT. In other words, the insulating film 15 is disposed on the peripheral portion of each output terminal OT and disposed between the adjacent output terminals OT, and overlaps the output line OL between the output terminals OT. In addition, in the overlapping area A1, none of the insulating films 14 and 15 illustrated in FIG. 4 is disposed except the area A2.

A cross-sectional structure of an input terminal IT1 will be described as a representative of the input terminals ITs with reference to FIG. 6. In addition, a cross-sectional structure of an output terminal OT2 will be described as a representative of the output terminals OTs with reference to FIG. 7.

Figure 6:
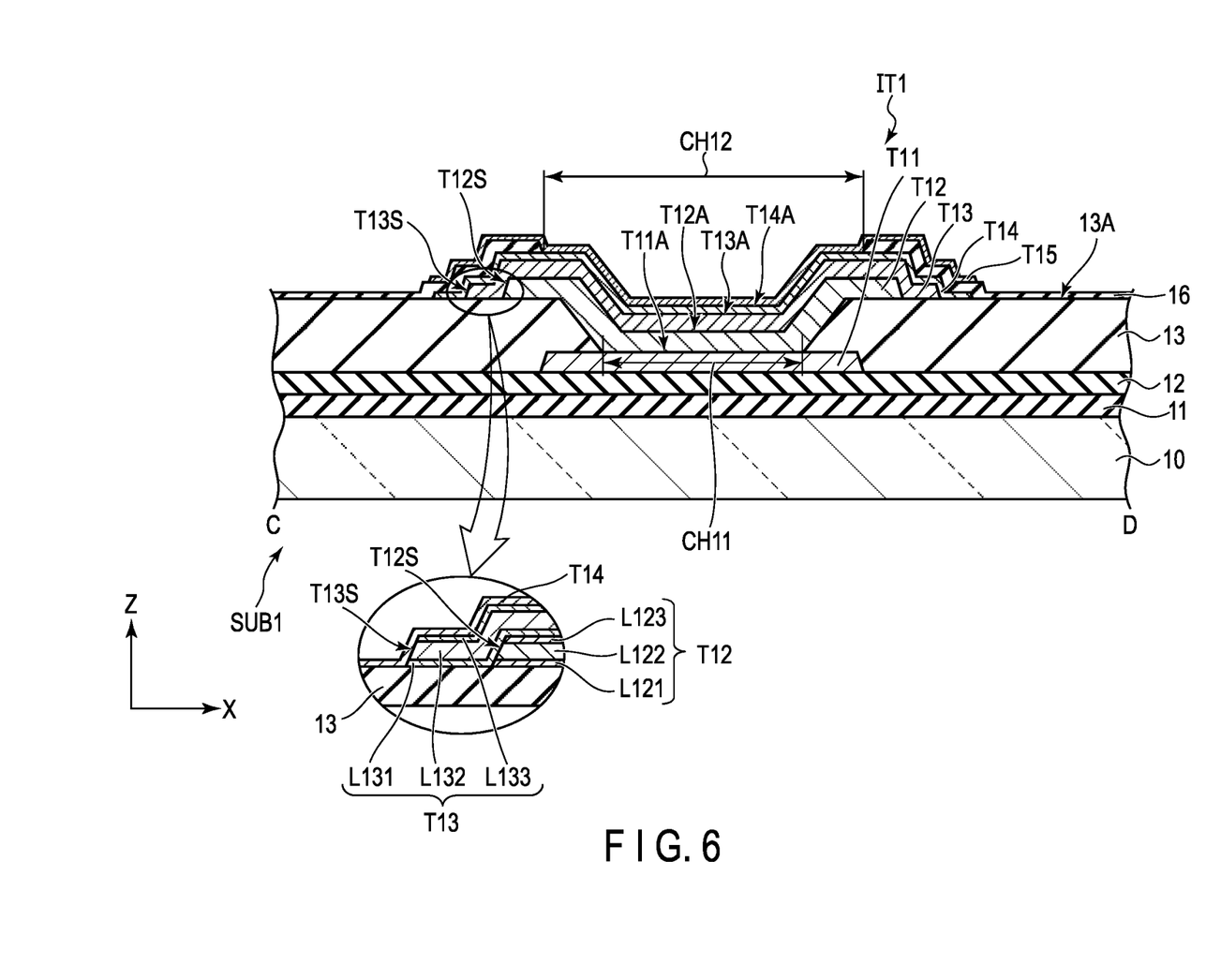
FIG. 6 is a cross-sectional view showing a configuration example of an input terminal IT1 taken along line C-D illustrated in FIG. 5.

FIG. 6 is a cross-sectional view showing a configuration example of the input terminal IT1 taken along line C-D illustrated in FIG. 5. The input terminal IT1 is a stacked layer body of a plurality of electrodes, and is configured as, for example, a stacked layer body in which a metal electrode T11, a metal electrode T12, a metal electrode T13, a transparent electrode T14, and a transparent electrode T15 are sequentially stacked in the third direction Z.

The metal electrode T11 is interposed between the insulating film 12 and the insulating film 13. The metal electrode T11 is located in the same layer as the scanning line G1 of FIG. 3, and is formed of the same material as the scanning line G1. For example, the metal electrode T11 is formed of a molybdenum-tungsten alloy. The insulating film 13 has a contact hole CH11 penetrating to the metal electrode T11.

The metal electrode T12 is disposed on the insulating film 13 and is in contact with an upper surface T11A of the metal electrode T11 exposed in the contact hole CH11. The metal electrode T12 is located in the same layer as the signal line S1 of FIG. 3 and is formed of the same material as the signal line S1. The metal electrode T12 is configured as, for example, a stacked layer body of metal layers L121 to L123.

The metal layers L121 and L123 are formed of the same material, and the metal layer L122 is formed of a material different from the metal layer L121. For example, the metal layers L121 and L123 are titanium layers formed of a titanium-based material, and the metal layer L122 is an aluminum layer formed of an aluminum-based material.

The metal electrode T13 covers the metal electrode T12. In other words, the metal electrode T13 is in contact with an upper surface 112A and a side surface T12S of the metal electrode T12. The metal electrode T13 is located in the same layer as the metal line ML1 of FIG. 3, and is formed of the same material as the metal line ML1. The metal electrode T13 is configured as, for example, a stacked layer body of metal layers L131 to L133. The metal layer L131 is in contact with the metal layers L121 to L123 on the side surface T12S.

The metal layers L131 and L133 are formed of the same material, and the metal layer L132 is formed of a material different from the metal layer L131. For example, the metal layers L131 and L133 are molybdenum layers formed of a molybdenum-based material, and the metal layer L132 is an aluminum layer formed of an aluminum-based material. The metal layers L131 and L133 may be titanium layers, and the metal layers L121 and L123 may be molybdenum layers.

The transparent electrode T14 covers the metal electrode T13. In other words, the transparent electrode T14 is in contact with an upper surface T13A and a side surface T13S of the metal electrode T13. The transparent electrode T14 is located in the same layer as the common electrode CE of FIG. 3, and is formed of the same material as the common electrode CE. The transparent electrode T14 is in contact with the metal layers L131 to L133 on the side surface T13S.

The insulating film 16 directly covers the insulating film 13. In other words, the insulating film 16 is in contact with an upper surface 13A of the insulating film 13. The insulating films 14 and 15 of FIG. 4 are not interposed between the insulating film 13 and the insulating film 16. The insulating film 16 has a contact hole CH12 penetrating to the transparent electrode T14.

The transparent electrode T15 is disposed on the insulating film 16 and is in contact with an upper surface 114A of the transparent electrode T14 exposed in the contact hole CH12. The transparent electrode T15 is located in the same layer as the pixel electrode PE1 of FIG. 3, and is formed of the same material as the pixel electrode PE1. Such transparent electrode T15 is electrically connected to the input-side terminal of the IC chip 1 illustrated in FIG. 1 through a conductive material.

Figure 7:
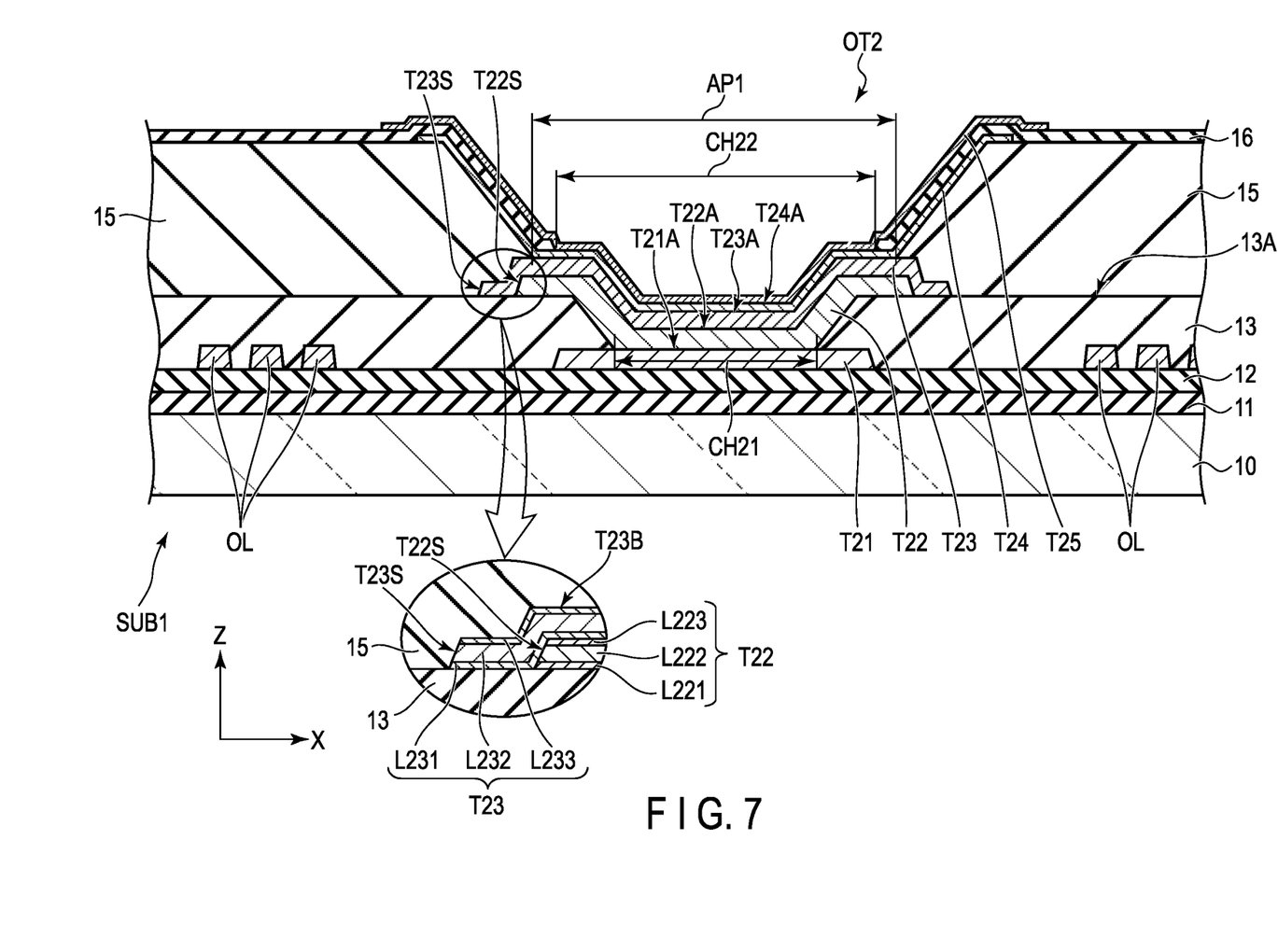
FIG. 7 is a cross-sectional view showing a configuration example of an output terminal OT2 taken along line E-F illustrated in FIG. 5.

FIG. 7 is a cross-sectional view showing a configuration example of the output terminal OT2 taken along line E-F illustrated in FIG. 5. The output terminal OT2 is a stacked layer body of a plurality of electrodes, and is configured as, for example, a stacked layer body in which a metal electrode T21, a metal electrode T22, a metal electrode T23, a transparent electrode T24, and a transparent electrode T25 are sequentially stacked in the third direction Z.

The metal electrode T21 is interposed between the insulating film 12 and the insulating film 13. The metal electrode T21 is formed of the same material as the scanning line G1 of FIG. 3 and the metal electrode T11 of FIG. 6. The insulating film 13 has a contact hole CH21 penetrating to the metal electrode T21.

The metal electrode T22 is disposed on the insulating film 13 and is in contact with an upper surface T21A of the metal electrode T21 exposed in the contact hole CH21. The metal electrode T22 is formed of the same material as the signal line S1 of FIG. 3 and the metal electrode T12 of FIG. 6. The metal electrode T22 is configured as, for example, a stacked layer body of metal layers L221 to L223.

The metal layers L221 and L223 are formed of the same material, and are, for example, titanium layers. The metal layer L222 is formed of a material different from that of the metal layer L221, and is, for example, an aluminum layer.

The metal electrode T23 covers the metal electrode T22. In other words, the metal electrode T23 is in contact with an upper surface T22A and a side surface T22S of the metal electrode T22. The metal electrode T23 is formed of the same material as the metal line ML1 of FIG. 3 and the metal electrode T13 of FIG. 6. The metal electrode T23 is configured as, for example, a stacked layer body of metal layers L231 to L233. The metal layer L231 is in contact with the metal layers L221 to L223 on the side surface T22S.

The metal layers L231 and L233 are formed of the same material, and are, for example, molybdenum layers. The metal layer L232 is formed of a material different from that of the metal layer L231, and is, for example, an aluminum layer. The metal layers L231 and L233 may be titanium layers, and the metal layers L221 and L223 may be molybdenum layers.

The insulating film 15 directly covers the insulating film 13. In other words, the insulating film 15 is in contact with the upper surface 13A of the insulating film 13. The insulating film 14 of FIG. 4 is not disposed around the output terminal OT2. In addition, the insulating film 15 is in contact with a peripheral portion T23B of an upper surface T23A and a side surface T23S of the metal electrode T23. In other words, the insulating film 15 has an opening AP1 penetrating to the upper surface T23A of the metal electrode T23. In other words, the insulating film 15 is disposed except the central portion of the metal electrode T23. The insulating film 15 is in contact with the metal layers L231 to L233 on the side surface T23S. In addition, the insulating film 15 overlaps the output line OL connected to an output terminal different from the output terminal OT2.

The transparent electrode T24 is disposed on the insulating film 15, and is in contact with the upper surface T23A of the metal electrode T23 exposed on the inner side (that is, the opening AP1) surrounded by the insulating film 15. The transparent electrode T24 is formed of the same material as the common electrode CE of FIG. 3 and the transparent electrode T14 of FIG. 6. The insulating film 16 directly covers the insulating film 15. The insulating film 16 has a contact hole CH22 penetrating to the transparent electrode T24.

The transparent electrode T25 is disposed on the insulating film 16 and is in contact with an upper surface T24A of the transparent electrode T24 exposed in the contact hole CH22. The transparent electrode T25 is formed of the same material as the pixel electrode PE1 of FIG. 3 and the transparent electrode T15 of FIG. 6. Such transparent electrode T15 is electrically connected to the output-side terminal of the IC chip 1 illustrated in FIG. 1 through a conductive material.

In the present specification, for example, the input terminal IT corresponds to a first terminal, the output terminal OT corresponds to a second terminal, the metal electrodes T11 and T21 correspond to a first metal electrode, the metal electrodes T12 and T22 correspond to a second metal electrode, the metal electrodes T13 and T23 correspond to a third metal electrode, the transparent electrodes T14 and T24 correspond to a first transparent electrode, and the transparent electrodes T15 and T25 correspond to a second transparent electrode. In addition, the metal layer L231 corresponds to a first layer, the metal layer L232 corresponds to a second layer, and the metal layer L233 corresponds to a third layer.

Figure 8:
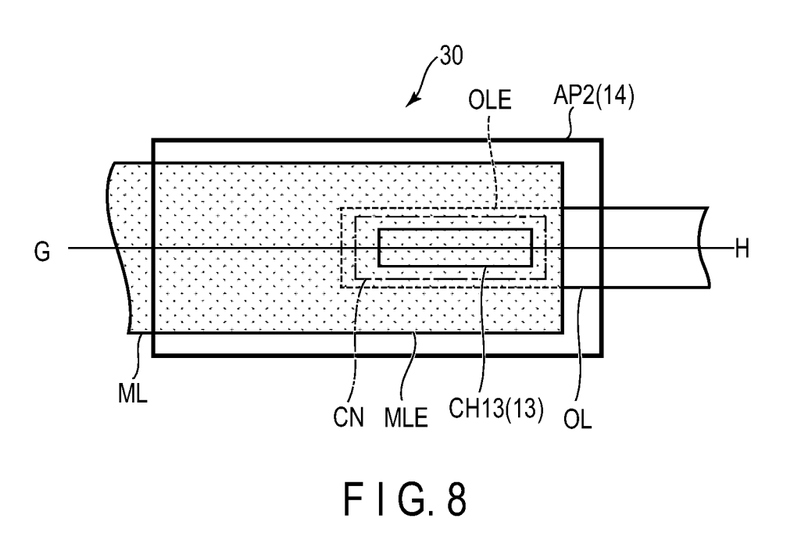
FIG. 8 is a plane view showing a configuration example of a layer conversion portion 30 illustrated in FIG. 5.

Next, the layer conversion portion 30 will be described.

FIG. 8 is a plane view showing a configuration example of the layer conversion portion 30 illustrated in FIG. 5. The layer conversion portion 30 corresponds to a portion that electrically connects the output line OL located in the same layer as the scanning line and the metal line ML located in a layer different from the scanning line. The output line OL is integrally formed with the metal electrode T21 of the output terminal OT2 illustrated in FIG. 7.

The layer conversion portion 30 includes a connection electrode CN interposed between the output line OL and the metal line ML. The connection electrode CN indicated by dash-dotted lines is located in the same layer as a signal line, which will be described later. The connection electrode CN overlaps an edge portion OLE indicated by dotted lines, in the output line OL. The edge portion OLE corresponds to a portion overlapping the metal line ML in planar view, of the output line OL. The connection electrode CN is electrically connected to the output line OL in a contact hole CH13 of the insulating film 13. The insulating film 14 is formed so as to surround the connection electrode CN and does not overlap the connection electrode CN. An opening AP2 of the insulating film 14 is formed in an area overlapping the connection electrode CN.

An edge portion MLE of the metal line ML is located in the opening AP2 and overlaps the connection electrode CN. In the opening AP2, since there is no insulating film interposed between the connection electrode CN and the edge portion MLE, the edge portion MLE is in contact with the connection electrode CN, and the metal line ML and the connection electrode CN are electrically connected to each other. In other words, the metal line ML and the output line OL are electrically connected to each other through the connection electrode CN.

Figure 9:
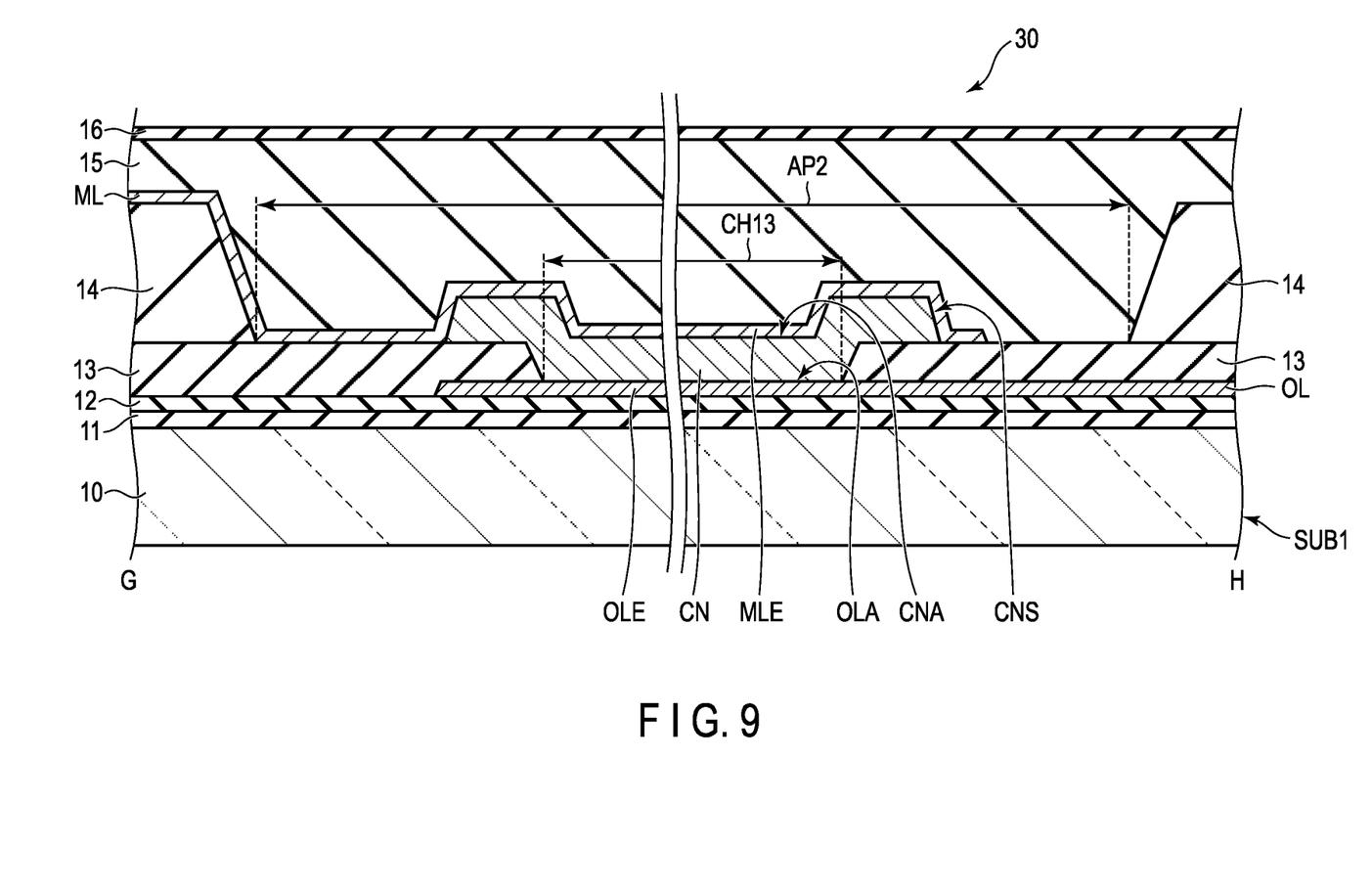
FIG. 9 is a cross-sectional view showing a configuration example of the layer conversion portion 30 taken along line G-H illustrated in FIG. 8.

FIG. 9 is a cross-sectional view showing a configuration example of the layer conversion portion 30 taken along line G-H illustrated in FIG. 8. The layer conversion portion 30 has a stacked layer body in which the edge portion OLE of the output line OL, the connection electrode CN, and the edge portion MLE of the metal line ML are sequentially stacked in the third direction Z.

That is, the output line OL including the edge portion OLE is interposed between the insulating film 12 and the insulating film 13. The output line OL is formed of the same material as the metal electrodes T11 and T21. The insulating film 13 has the contact hole CH13 penetrating to the edge portion OLE.

The connection electrode CN is disposed on the insulating film 13 and is in contact with an upper surface OLA of the edge portion OLE exposed in the contact hole CH13. The connection electrode CN is formed of the same material as the metal electrodes T12 and T22. Similar to the metal electrode T22 illustrated in FIG. 7, the connection electrode CN is configured as a stacked layer body including an aluminum layer between titanium layers, but a detailed description thereof is omitted here.

The insulating film 14 has the opening AP2 penetrating to the connection electrode CN and the insulating film 13. The metal line ML is disposed on the insulating film 14 surrounding the connection electrode CN and extends to the opening AP2. The edge portion MLE of the metal line ML covers the connection electrode CN in the opening AP2. In other words, the edge portion MLE is in contact with an upper surface CNA and a side surface CNS of the connection electrode CN. In addition, the metal line ML is in contact with the insulating film 13 between the insulating film 14 and the connection electrode CN. The metal line ML is formed of the same material as the metal electrodes T13 and T23. Similar to the metal electrode T23 illustrated in FIG. 7, the metal line ML is configured as a stacked layer body including an aluminum layer between molybdenum layers, but a detailed description thereof is omitted here.

The insulating film 15 directly covers the metal line ML including the edge portion MLE and the insulating film 14. In addition, the insulating film 15 is in contact with the insulating film 13 between the edge portion MLE and the insulating film 14. The insulating film 16 directly covers the insulating film 15.

Incidentally, with the movement of electrons generated in the manufacturing process of the display device DSP, excessive development of the insulating film or excessive dissolution of the metal electrode exposed from the contact hole may occur in the contact hole formed in the insulating film of the display portion DA. Such a phenomenon causes a problem such that the edge portion of the insulating film lifts from the metal electrode.

According to the present embodiment described above, in the output terminal OT electrically connected to the line (e.g., metal line ML) of the display portion DA, the side surface T22S of the metal electrode T22 is covered with the metal electrode T23, and moreover, the side surface T23S of the metal electrode T23 is covered with the insulating film 15. For this reason, when each of the metal electrodes T22 and T23 is configured as a stacked layer body of dissimilar metals, an alkaline aqueous solution applied at the time of forming the insulating film 15 does not come into contact with the dissimilar metals on the side surfaces T22S and T23S, which suppresses the generation of electrons. As a result, in the contact hole of the display portion DA, excessive development of the insulating film and excessive dissolution of the metal electrode associated with generation of electrons are suppressed.

For example, when the contact hole CH1 is formed in the insulating film 15 illustrated in FIG. 4, generation of electrons at the output terminal electrically connected to the metal line ML3 is suppressed, and movement of electrons to the metal line ML3 is also suppressed. For this reason, excessive development of the insulating film 15 and excessive dissolution of the metal line ML3 in the contact hole CH1 are suppressed, and lifting of the edge portion of the insulating film 15 along the contact hole CH1 is suppressed. As a result, a connection failure between the common electrode CE and the metal line ML in the contact hole CH1 is suppressed.

In addition, in the layer conversion portion 30 between the output terminal OT and the metal line ML, the insulating film 14 is spaced apart from the connection electrode CN. For this reason, even if electrons are generated in the connection electrode CN, no contact surface between the connection electrode CN and the insulating film 14 is present, and excessive development of the insulating film 14 is thus suppressed. In addition, the lifting of the edge portion of the insulating film 14 along the opening AP2 is suppressed. As a result, a connection failure between the metal line ML and the connection electrode CN in the layer conversion portion 30 is suppressed.

Therefore, degradation in reliability is suppressed.

Figure 10:
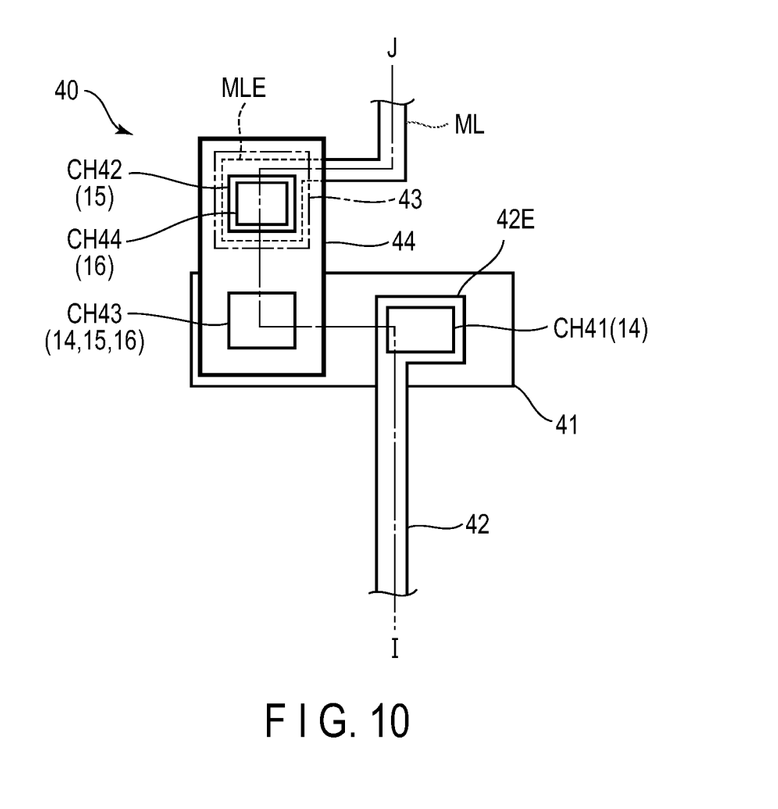
FIG. 10 is a plane view showing a configuration example of a relay portion 40 illustrated in FIG. 5.

Next, the relay portion 40 will be described.

FIG. 10 is a plane view showing a configuration example of the relay portion 40 illustrated in FIG. 5. The relay portion 40 includes a first relay electrode 41 located in the same layer as the signal line, a second relay electrode 42 located in the same layer as the metal line ML, a third relay electrode 43 located in the same layer as the common electrode CE, and a fourth relay electrode 44 located in the same layer as the pixel electrode PE1.

The second relay electrode 42 is spaced apart from the metal line ML. An edge portion 42E of the second relay electrode 42 overlaps the first relay electrode 41. The second relay electrode 42 is electrically connected to the first relay electrode 41 in the contact hole CH41 of the insulating film 14. The second relay electrode 42 illustrated here is replaced with the metal line ML illustrated in FIG. 9, is in contact with the connection electrode CN, and is electrically connected to the output line OL.

The third relay electrode 43 indicated by dash-dotted lines overlaps an edge portion MLE of the metal line ML. The third relay electrode 43 is electrically connected to the metal line ML in a contact hole CH42 penetrating the insulating film 15.

The fourth relay electrode 44 overlaps the first relay electrode 41 and the third relay electrode 43. The fourth relay electrode 44 is electrically connected to the first relay electrode 41 in a contact hole CH43 penetrating the insulating films 14 to 16. In addition, the fourth relay electrode 44 is electrically connected to the third relay electrode 43 in a contact hole CH44 penetrating the insulating film 16. In other words, the second relay electrode 42 electrically connected to the output line OL illustrated in FIG. 9 is electrically connected to the metal line ML through the first relay electrode 41, the fourth relay electrode 44, and the third relay electrode 43.

Figure 11:
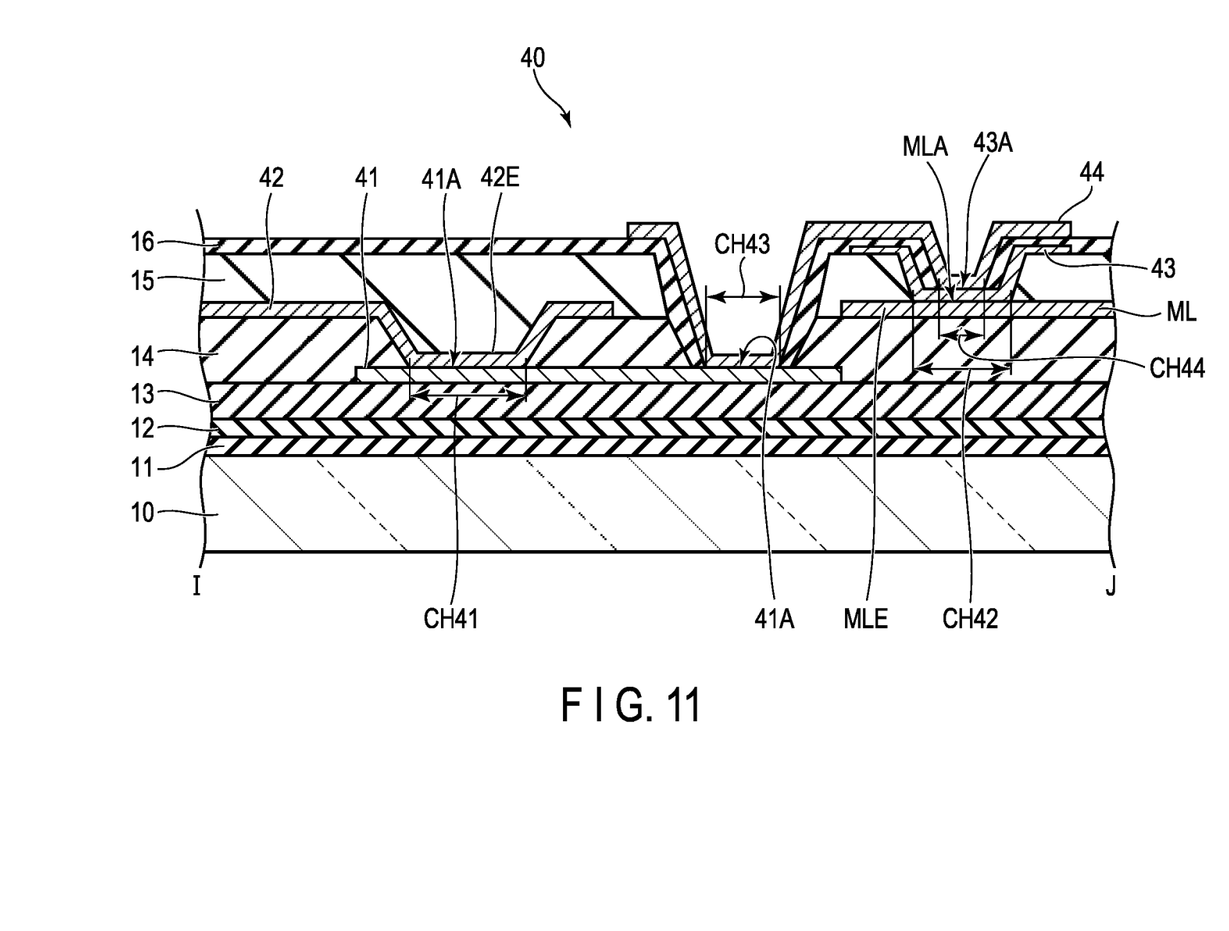
FIG. 11 is a cross-sectional view showing a configuration example of the relay portion 40 taken along line I-J illustrated in FIG. 10.

FIG. 11 is a cross-sectional view showing a configuration example of the relay portion 40 taken along line I-J illustrated in FIG. 10.

The first relay electrode 41 is interposed between the insulating film 13 and the insulating film 14. The first relay electrode 41 is formed of the same material as the signal line S, and the metal electrodes T12 and T22. The insulating film 14 has the contact hole CH41 penetrating to the first relay electrode 41.

Similar to the metal line ML, the second relay electrode 42 including the edge portion 42E is interposed between the insulating film 14 and the insulating film 15. The edge portion 42E is in contact with an upper surface 41A of the first relay electrode 41 exposed in the contact hole CH41. The second relay electrode 42 is formed of the same material as the metal line ML, and the metal electrodes T13 and T23. The insulating film 15 directly covers the second relay electrode 42. In addition, the insulating film 15 has the contact hole CH42 penetrating to the edge portion MLE of the metal line ML.

The third relay electrode 43 is interposed between the insulating film 15 and the insulating film 16. The third relay electrode 43 is in contact with an upper surface MLA of the edge portion MLE exposed in the contact hole CH42. The third relay electrode 43 is formed of the same material as the common electrode CE, and the transparent electrodes T14 and T24.

The insulating films 14 to 16 have the contact hole CH43 penetrating to the first relay electrode 41. In addition, the insulating film 16 has the contact hole CH44 penetrating to third relay electrode 43.

The fourth relay electrode 44 is disposed on the insulating film 16. The fourth relay electrode 44 is in contact with the upper surface 41A of the first relay electrode 41 exposed in the contact hole CH43. In addition, the fourth relay electrode 44 is in contact with an upper surface 43A of the third relay electrode 43 exposed in contact hole CH44. The fourth relay electrode 44 is formed of the same material as the pixel electrode PE1, and the transparent electrodes T15 and T25.

According to this embodiment, in the manufacturing stage where the insulating films 14 and 15 are formed, the fourth relay electrode 44 of the relay portion 40 is not present, and the output terminal OT and the metal line ML are not electrically connected. For this reason, even if electrons are generated at the output terminal OT in the manufacturing stage where the insulating films 14 and 15 are formed, the movement of electrons to the metal line ML is suppressed in the relay portion 40. In the contact hole of the display portion DA, excessive development of the insulating film and excessive dissolution of the metal electrode due to generation of electrons are suppressed. Therefore, as described above, degradation in reliability is suppressed.

The relay portion 40 described here can be combined with the layer conversion portion 30 described with reference to FIGS. 8 and 9.

When the relay portion 40 is applied, a structure similar to that of the input terminal IT1 described with reference to FIG. 6 can be applied to the output terminal OT. In other words, the side surface T23S of the metal electrode T23 constituting the output terminal OT may not be covered with the insulating film 15.

As described above, according to the present embodiment, it is possible to provide a display device that suppresses degradation in reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The display panel PNL of the present embodiment is not limited to a transmissive type having a transmissive display function of displaying an image by selectively transmitting light from the back side of the first substrate SUB1, and may be either a reflective type having a reflective display function of displaying an image by selectively reflecting light from the front side of the second substrate SUB2, or a transflective type having the transmissive display function and the reflective display function.

In addition, in the present embodiment, the display panel PNL corresponding to the display mode using a lateral electric field along the main surface of the substrate has been described, but the present invention is not limited thereto, and the display panel may be any display panel corresponding to a display mode using a longitudinal electric field along a normal of the main surface of the substrate, a display mode using an inclined electric field angled with respect to the main surface of the substrate, and a display mode using an appropriate combination of the lateral electric field, the longitudinal electric field, and the inclined electric field. Here, the main surface of the substrate is a surface parallel to the X-Y plane.

What is claimed is:

1. A display device comprising:
    a display portion; a first terminal; a second terminal located between the display portion and the first terminal; and an insulating film, wherein
    each of the first terminal and the second terminal is a stacked layer body of a metal electrode and a first transparent electrode,
    in the first terminal, the first transparent electrode is in contact with an upper surface and a side surface of the metal electrode,
    in the second terminal, the insulating film is in contact with a side surface of the metal electrode,
    in the second terminal, the first transparent electrode is in contact with the upper surface of the metal electrode in an inside surrounded by the insulating film,
    in each of the first terminal and the second terminal, the metal electrode is a stacked layer body of a first layer, a second layer formed of a material different from the first layer, and a third layer formed of the same material as the first layer, and
    in the second terminal, the insulating film is in contact with the first layer, the second layer, and the third layer on the side surface of the metal electrode.

2. The display device according to claim 1, wherein the insulating film is an organic insulating film.

3. The display device according to claim 1, wherein in each of the metal electrodes of the first terminal and the second terminal, the first layer is a first metal electrode, the second layer is a second metal electrode, and the third layer is a third metal electrode.

4. A display device comprising:
    a display portion; a first terminal; a second terminal located between the display portion and the first terminal; and a relay portion located between the display portion and the second terminal, wherein
    the display portion includes:
    a scanning line; a signal line; a metal line located directly above the signal line; a common electrode electrically connected to the metal line; and a pixel electrode located directly above the common electrode, and
    the relay portion includes:
    a first relay electrode formed of the same material as the signal line;
    a second relay electrode electrically connected to the second terminal, formed of the same material as the metal line, spaced apart from the metal line, and in contact with the first relay electrode;
    a third relay electrode formed of the same material as the common electrode and in contact with the metal line; and
    a fourth relay electrode formed of the same material as the pixel electrode and in contact with the first relay electrode and the third relay electrode.

5. The display device according to claim 4, wherein the second terminal is a stacked layer body of a first metal electrode, a second metal electrode formed of the same material as the first relay electrode, a third metal electrode formed of the same material as the second relay electrode, a first transparent electrode formed of the same material as the third relay electrode, and a second transparent electrode formed of the same material as the fourth relay electrode.

6. The display device according to claim 5, further comprising:
    a layer conversion portion electrically connecting an output line integrated with the first metal electrode of the second terminal and the second relay electrode; an inorganic insulating film; and a first organic insulating film located between the first relay electrode and the second relay electrode, wherein
    the layer conversion portion includes a connection electrode which is disposed on the inorganic insulating film having a contact hole penetrating to the output line, is formed of the same material as the second metal electrode, and is in contact with the output line in the contact hole, and
    the second relay electrode is disposed on the first organic insulating film surrounding the connection electrode, is in contact with the connection electrode at an opening of the first organic insulating film, and is in contact with the inorganic insulating film between the first organic insulating film and the connection electrode.

7. The display device according to claim 6, further comprising
    a second organic insulating film located between the metal line and the third relay electrode, wherein
    the second organic insulating film directly covers the second relay electrode.

8. A display device comprising:
    a display portion including a scanning line, a signal line extending in a direction intersecting the scanning line, a metal line located directly above the signal line, a common electrode electrically connected to the metal line, and a pixel electrode overlapping the common electrode; and
    a mounting portion including a first terminal and a second terminal connected to an external circuit, wherein
    each of the first terminal and the second terminal is a stacked layer body of a first metal electrode formed of the same material as the scanning line, a second metal electrode covering the first metal electrode and formed of the same material as the signal line, and a third metal electrode covering the second metal electrode and formed of the same material as the metal line, and
    in any of the first terminal and the second terminal, an edge portion of the third metal electrode is covered with an insulating film formed between the signal line and the common electrode.

9. The display device according to claim 8, wherein in each of the first terminal and the second terminal, the third metal electrode is a stacked layer body of a first layer, a second layer formed of a material different from the first layer, and a third layer formed of the same material as the first layer, and
    in the second terminal, the insulating film is in contact with the first layer, the second layer, and the third layer at the edge portion of the third metal electrode.

10. The display device according to claim 8, wherein the insulating film is an organic insulating film.

* * * * *